(12) United States Patent
Njalsson et al.

(10) Patent No.: US 12,514,730 B2
(45) Date of Patent: Jan. 6, 2026

(54) ANKLE-FOOT ORTHOSIS AND METHOD FOR MAKING THE SAME

(71) Applicant: OSSUR ICELAND EHF, Reykjavik (IS)

(72) Inventors: Tomas Njalsson, Reykjavik (IS); David Sandahl, Reykjavik (IS); Valgeir Pétursson, Reykjavik (IS)

(73) Assignee: OSSUR ICELAND EHF, Reykjavik (IS)

( * ) Notice: Subject to any disclaimer, the term of this patent is extended or adjusted under 35 U.S.C. 154(b) by 191 days.

(21) Appl. No.: 18/577,798

(22) PCT Filed: Jul. 11, 2022

(86) PCT No.: PCT/US2022/036652
§ 371 (c)(1),
(2) Date: Jan. 9, 2024

(87) PCT Pub. No.: WO2023/287689
PCT Pub. Date: Jan. 19, 2023

(65) Prior Publication Data
US 2024/0261127 A1    Aug. 8, 2024

Related U.S. Application Data

(60) Provisional application No. 63/220,707, filed on Jul. 12, 2021.

(51) Int. Cl.
*A61F 5/01*   (2006.01)
*A61L 15/12*  (2006.01)
*A61L 15/14*  (2006.01)

(52) U.S. Cl.
CPC ........... *A61F 5/0113* (2013.01); *A61L 15/125* (2013.01); *A61L 15/14* (2013.01)

(58) Field of Classification Search
CPC .... A61F 5/0113; A61F 5/0111; A61F 5/0104; A61F 5/0102; A61F 5/01; A61F 5/00;
(Continued)

(56) References Cited

U.S. PATENT DOCUMENTS 5,897,515 A * 4/1999 Willner ................. A61F 5/0111
602/6
6,146,344 A * 11/2000 Bader .................... A61F 5/0111
602/8

(Continued)

FOREIGN PATENT DOCUMENTS

EP      1114626 A2    7/2001
EP      2524674 A1 * 11/2012  ............ A61F 5/0113
(Continued)

OTHER PUBLICATIONS

International Search Report from corresponding PCT Application No. PCT/US2022/036652, Oct. 25, 2022.

*Primary Examiner* — Tarla R Patel
(74) *Attorney, Agent, or Firm* — Workman Nydegger

(57) ABSTRACT

An ankle-foot orthosis forming a monolithic structure and include at least two different material components. The first material component has at least one tape layer consisting of a continuous fiber-reinforced thermoplastic composite, and a second polymeric material component surrounds at least in part the tape and includes a thermoplastic material into which the first material component is embedded. A resin material of the first material component is bonded to the second polymeric material component.

17 Claims, 14 Drawing Sheets

(58) Field of Classification Search
CPC ........ A61L 15/125; A61L 15/14; A61L 15/12; A61L 15/07
See application file for complete search history.

(56) References Cited

U.S. PATENT DOCUMENTS

| | | | |
|---|---|---|---|
| 6,887,213 B2 * | 5/2005 | Smits | A61F 5/0111 602/23 |
| 8,480,604 B2 * | 7/2013 | Messer | A61F 5/0111 602/8 |
| 2008/0319361 A1 * | 12/2008 | Messer | A61F 5/0111 602/8 |
| 2010/0191162 A1 * | 7/2010 | Chang | A61F 5/0111 602/5 |
| 2020/0352771 A1 | 11/2020 | Bialowons et al. | |
| 2020/0375776 A1 * | 12/2020 | Thor | A61F 5/0111 |

FOREIGN PATENT DOCUMENTS

| | | | | |
|---|---|---|---|---|
| GB | 2317568 A * | 4/1998 | | A61F 5/0111 |
| WO | 02083040 A1 | 10/2002 | | |

* cited by examiner

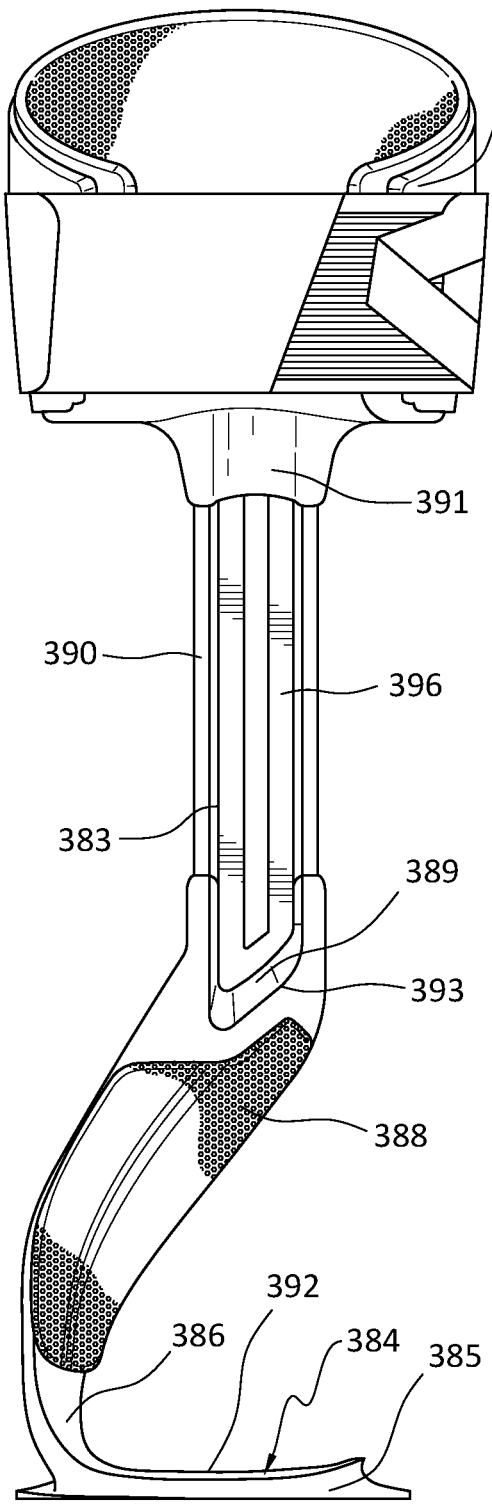
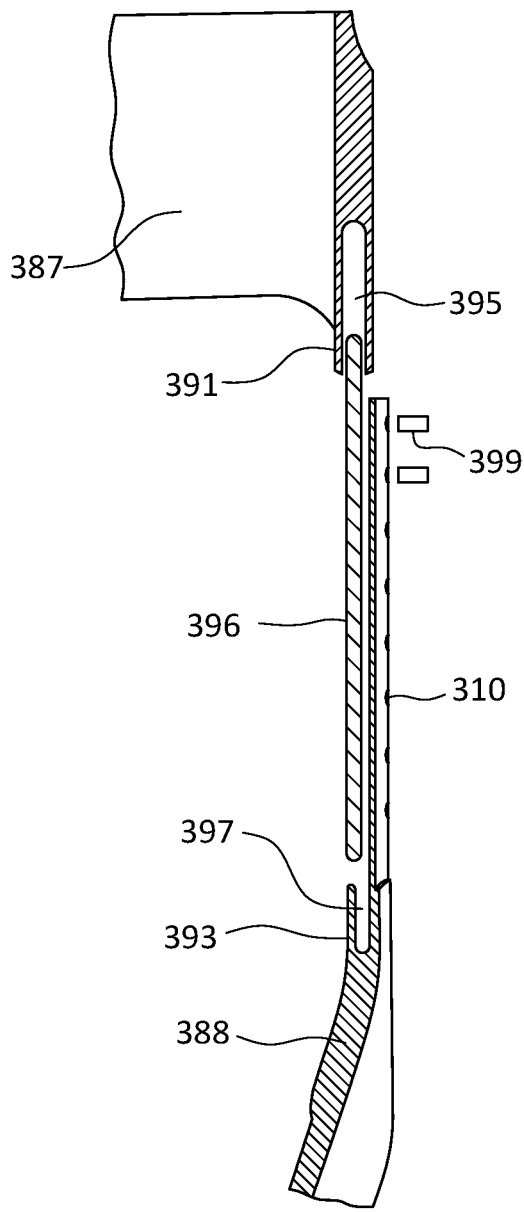
FIG. 11A
FIG. 11B

ANKLE-FOOT ORTHOSIS AND METHOD FOR MAKING THE SAME

BACKGROUND

1. Field of the Disclosure

The present disclosure relates to orthotic devices utilized to limit the movement of a lower limb, and more particularly, the present disclosure relates to an ankle-foot orthosis (AFO) for stabilizing and controlling the motion of the ankle and foot and a method for making the AFO.

2. Description of the Related Art

An ankle-foot orthosis (AFO) is a medical device used to support and align the ankle and foot by suppressing spastic and overpowering ankle and foot muscles, assisting weak and paralyzed ankle and foot muscles, and preventing or correcting ankle and foot deformities. An AFO is often prescribed for users with gait deviations related to muscle weakness.

An AFO substitutes or compensates for weak dorsiflexors during a swing phase and weak plantar flexors during the stance phase of a user's gait. In effect, an AFO can be used to support and align the ankle and the foot, suppress spastic and overpowering ankle and foot muscles, assist weak and paralyzed muscles of the ankle and foot, prevent and correct ankle and foot deformities, and improve the functions of the foot.

Many known AFOs are configured to concentrate on the ankle and knee biomechanics while only providing minimal support to the foot. However, it has been found that users of AFOs require at least some foot support of the type offered by the aforementioned orthotic footplates.

An AFO is particularly useful in assisting the functions of the ankle and foot when a user has a gait condition commonly known as "drop foot." Drop foot is a neuro-muscular condition resulting in the inability of a user to sufficiently lift one of their feet during a walking stride. Drop foot may result from a cerebrovascular accident, spinal cord injury, hereditary and sensory neuropathies, neuromuscular disease, or any damage to the muscle and nerves required to activate the muscle of the neuromuscular system related to the foot.

There are two common complications from drop foot. First, the individual cannot control the falling of their foot after striking their heel. Consequently, the foot will slap the ground on every step, commonly referred to as slap foot. This is typically due to the impairment of a patient's dorsiflexor muscles located below the knee on the front of the leg and lifting the foot from a position substantially aligned with the lower leg to a substantially perpendicular position lower leg, known as dorsiflexion. Impairment of the dorsiflexor muscles thus results in excessive plantar flexion, which is the action of extending the foot from a position substantially perpendicular to the lower leg to a position substantially parallel to the lower leg.

The second complication is the inability to clear the toe during the swing phase of a gait cycle. This causes the user to drag their toe on the ground throughout the swing phase and may lead to painful blistering and tearing of the epidermis. Hence, an AFO can be prescribed to compensate for the weakness of the dorsiflexors by resisting plantar flexion at the heel strike and swing phase during a gait cycle.

While there are many AFOs, dynamic AFOs have suffered from material defects due to breakage from repeated use. Certain thickening regions have provided some solutions, such as the interface between a footplate and an ankle strut. Yet, such overengineering can lead to discomfort for the user and create unwanted additional weight.

To provide the desired strength needed in an AFO, AFOs are generally made from hand lay-up carbon fiber to get sufficient strength and flexibility. However, such tedious construction adds time and makes fabricating the AFO expensive. Another issue with AFOs, particularly when they possess a complex shape such as a spiraling section adapted to extend from a medial or lateral side of a footplate or footbed of the AFO to a posterior portion of the AFO, is balancing the properties of the AFO to be sufficiently stiff to provide support yet sufficiently flexible to provide a comfortable AFO for the user. AFOs are created using injection-molded long fiber, such as polyamide or nylon, in combination with a high carbon fiber content or using compression-molded carbon fiber yield products that are extremely stiff and strong with little flexibility. Flexing these products beyond certain levels can lead to material failure and shatter or burst apart.

Accordingly, it is readily apparent that there is a need for an AFO that provides support for both the medial and lateral ankle portions of a patient, dynamic dorsiflexion and plantar flexion support, a footplate permitting easy toe rollover, and a dynamic design that is more durable and less prone to material failure through normal use, as well as cheaper and easily repeatable to make.

SUMMARY

According to an embodiment of the disclosure, an ankle-foot orthosis (AFO) is provided with a spiraling section migrating from an interface or strut connecting to a footplate or footbed to a posterior portion adapted to secure along a posterior side of a lower leg. The interface or strut preferably extends from the lateral or medial side of the footplate or footbed. The manner in which the AFO is constructed balances stiffness and flexibility and offers a construction that eliminates hand construction of the AFO.

The AFO is constructed with high-performance composite tapes and laminates that combine thermoplastic polymers and continuous fibers to create a continuous fiber-reinforced thermoplastic (CFRTP) composite. The CFRTP composite is strategically placed in the AFO and is embedded within a thermoplastic base material or component. The AFO may be compression molded with the CFRTP reinforcing the thermoplastic base material to increase strength, stiffness, and impact resistance while allowing for optimal flexibility in selected regions and repeatability of surface features and peripheral contours produced by the thermoplastic base material molded about the CFRTP. The CFRTP and the thermoplastic base material have good adhesion and material compatibility for bonding to form a monolithic AFO overcoming the disadvantages of the prior art. Hence, the AFO is an injection-molded AFO with an injection-molded structure or structure molded according to a predetermined tool or mold. The CFRTP is strategically located at predetermined locations of the AFO. For example, a thick quad-ply laminate can be used in the strut to footplate connection for added strength and stiffness. In contrast, a uni-layer laminate can be used in the footplate for flexibility and spring back when using the device.

According to a method for making the AFO, a first material component includes cutting, such as die-cutting, a tape consisting of a CFRTP to a predetermined shape corresponding to the AFO. Next, the tape is thermoformed to a three-dimensional shape from the predetermined shape.

The thermoformed tape is placed in a mold and may be preheated. A second polymeric material component is molded over the tape, such that the second polymeric material component is thermoplastic. The first material component may comprise a plurality of tape segments that may be cut, thermoformed, and placed into a mold. The plurality of tape segments is secured to one another by the second polymeric material component, which encases and surrounds the plurality of tape segments, providing a definitive outer periphery to the AFO once molded about the plurality of tape segments.

The AFO and method for making the AFO have the benefit of lower manufacturing costs. Traditional hand lay-up of carbon fiber types of AFOs are manufactured using almost exclusively human labor. As a result, the manufacturing cost is high, and manufacturing yield can be impacted. In contrast, an injection overmolded AFO, according to the embodiments and methods of this disclosure, can be manufactured more automatically with faster cycle times and lower cost.

The AFO and method for making the AFO offer repeatability with the structure and method for making the AFO. When manufacturing traditional carbon fiber AFOs, no two units are aesthetically identical. Minor imperfections in the surface of the carbon fiber are often prominent for the user, hence the manufacturing yield can be impacted. An injection overmolded AFO offers greater repeatability than traditional carbon fiber AFOs.

The AFO and method for making the AFO enable the fabrication of complex shapes. Injection overmolding an AFO or providing an injection-molded AFO allows for more complex shapes and features of the AFO itself. For example, the AFO can be designed to have integrated buckles, variable stiffness adjustments, and overmolded soft edges due to the good adherence of a thermoplastic elastomer (TPE) to the thermoplastic base material surrounding the CFRTP.

The AFO and method for making the AFO offer further thermoformability once the AFO is injection molded. When fitting a new AFO, considerable work goes into fitting the device onto end-users. The AFO must be selected to conform to the anatomy of every user, and designated shoes must be selected that can both fit the end-user and the AFO device. Traditional carbon fiber AFOs can be machined slightly to fit the individual; however, the shape of the AFO cannot be altered further. In contrast, an injection molded AFO is thermoformable. This arrangement allows the Certified Prosthetist and Orthotist (CPO) or clinician to heat and shape the AFO to fit every user. The ability to thermoform the AFO can address common issues during fitting, such as supination/pronation of the foot, heel height discrepancy, zero angle, and shoe fit.

The AFO and method for making the AFO enable local strengthening of the AFO. The material characteristics of an injection overmolded AFO are partially based on the placement of the embedded CFRTP laminate. Therefore, when designing and manufacturing an injection overmolded AFO, the CFRTP laminate can be placed strategically to offer different material characteristics in different regions of the AFO. For example, a thick laminate having multiple layers can be used in the ankle strut to footplate connection for added strength and stiffness. In contrast, a single or multiple unidirectional layer laminate can be used in the footplate for flexibility and spring back during the user's gait.

These and other features, aspects, and advantages of the present invention will become better understood regarding the following description, appended claims, and accompanying drawings.

Glossary

As used, the term "proximal" has its ordinary meaning and refers to a location next to or near the point of attachment or origin or a central point, or located toward the center of the body. Likewise, the term "distal" has its ordinary meaning. It refers to a location situated away from the point of attachment or origin or a central point located away from the center of the body. The term "posterior" also has its ordinary meaning and refers to a location behind or to the rear of another location.

The terms "rigid," "flexible," and "resilient" may distinguish characteristics of portions of certain features of the AFO. The term "rigid" should denote that an element of the AFO, such as a reinforced connection, is generally devoid of flexibility. Within the context of features that are "rigid," it should indicate that they do not lose their overall shape when force is applied and may break if bent with sufficient force. The term "flexible" should denote that features are capable of repeated bending such that the features may be bent into retained shapes or the features retain no general shape but continuously deform when force is applied. The term "resilient" may qualify such flexible features as generally returning to an initial general shape without permanent deformation. The term "substantial" and variants thereof take on the ordinary meaning of being "for the most part" or to a "great or significant extent."

The term "continuous fiber-reinforced thermoplastic" should convey a composite material that contains high-performance continuous fibers, such as carbon fiber, that is impregnated in a matrix of thermoplastics.

The term "injection molding" conveys its conventional meaning and yields a unique structure that is distinguishable over other fabrication processes by injecting molten plastic resin materials into a tool or mold that is subsequently compressed and cooled to a definitive shape.

The term "monolithic" should convey a single unitary structure, such as a thermoplastic composite consisting of or constituting a single unit. For example, the plastic can be reinforced with materials such as continuous fibers like E-glass, aramid, and carbon fibers. By "monolithic," it can also be a combination of at least two materials, such as a continuous fiber-reinforced thermoplastic and a second polymeric material, that are compressed and integrally bonded to constitute a single unitary structure.

The term "periphery" has its ordinary meaning and refers to the outer limits or edge of an area or object.

The terms "spiral" and "spiraling" mean to move in a spiral course or following a spiral course.

The term "tape" should convey a structure having a plurality of unidirectionally aligned fiber tows forming a layer that can be thermoformed into a three-dimensional shape. Multiple tape layers are used to form a laminate consisting of a plurality of tape layers arranged in one or more directions. Tape segments may denote segments of tape that comprise one or more layers of tape.

BRIEF DESCRIPTION OF THE DRAWINGS

FIG. 11A is a frontal elevational view of the ankle-foot orthosis of FIG. 10.

FIG. 11B is a sectional elevational view of the stiffness adjuster in the ankle-foot orthosis of FIG. 11A.

In the various figures, similar elements are provided with similar reference numbers. The drawing figures are not drawn to scale or proportion and are drawn to provide a better understanding of the components and are not intended to be limiting in scope but rather provide exemplary illustrations.

DETAILED DESCRIPTION OF VARIOUS EMBODIMENTS

Figure 1:
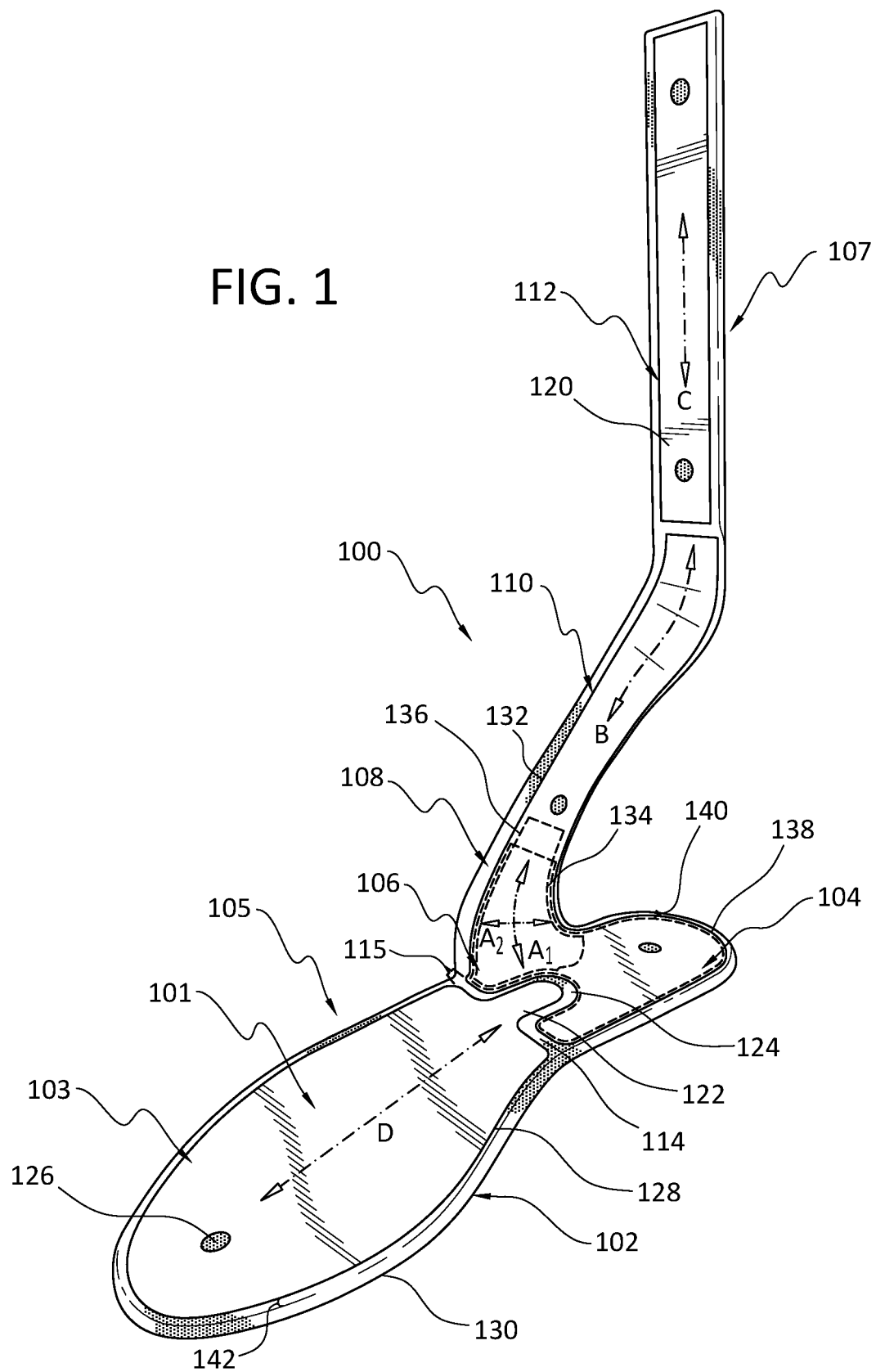
FIG. 1 is a first perspective showing a first embodiment of an ankle-foot orthosis (AFO).

A better understanding of different embodiments of the disclosure may be had from the following description read with the accompanying drawings in which reference characters refer to like elements. While the disclosure is susceptible to various modifications and alternative constructions, certain illustrative embodiments are in the drawings described below. It should be understood, however, that there is no intention to limit the disclosure to the embodiments disclosed. On the contrary, the intention covers all modifications, alternative constructions, combinations, and equivalents falling within the spirit and scope of the disclosure.

The embodiments described herein offer an ankle-foot orthosis (AFO) fabricated and structured without the attendant drawbacks of conventional AFOs, particularly those constructed from carbon fiber. Instead, the embodiments of the disclosure are injection molded AFOs that, while possessing the characteristics known in carbon-fiber-based AFOs, offer improved strength, flexibility, energy return, and aesthetics. In addition, due to their injection-molded construction, the embodiments are easily repeatable, lowering the cost of goods and allowing for more complex designs over the conventional AFOs to enable more effective treatment of indications for which the AFO serves.

As will be better understood from the following description, the expression "injection molded" conveys its conventional meaning and yields a unique structure that is distinguishable over other fabrication processes. Injection molding is a manufacturing process that allows for parts to be produced in large volumes. It works by injecting plastic resin materials made molten and injected into a tool or mold, compressed, and cooled to a definitive shape.

Injection molding materials are most commonly used with thermoplastic and thermosetting polymers. Thermoset material, such as an epoxy resin that cures once exposed to air, is a material that cures and would burn after curing if one attempt is made to melt it. Thermoplastic material, by contrast, is a plastic material that can be melted, cool, solidified, and then melted again without burning.

In the embodiments that follow, the injection molding process imparts a structure and is considered a structural limitation in describing the AFO. Components of the AFO are joined and secured from an injection molding process, particularly as a first material component of the AFO includes a tape or a plurality of tape layers consisting of a continuous fiber-reinforced thermoplastic composite, which in turn are secured to one another by a second polymeric material component surrounding the first material component and formed by injection molding about the first material component into a definitive shape of the AFO, such that the second polymeric material component and the first material component are interbonded to one another by interfusion of the second polymeric material component and material of the first material component. These first and second polymeric material components are compressed and integrally bonded to form a definitive monolithic structure. The mold is used in the injection molding, and the second polymeric material component is injected into the mold, forming the shape of an AFO; the understanding of the term "injection molding" used herein connotes a specific structure that is considered a structural limitation.

Figure 2:
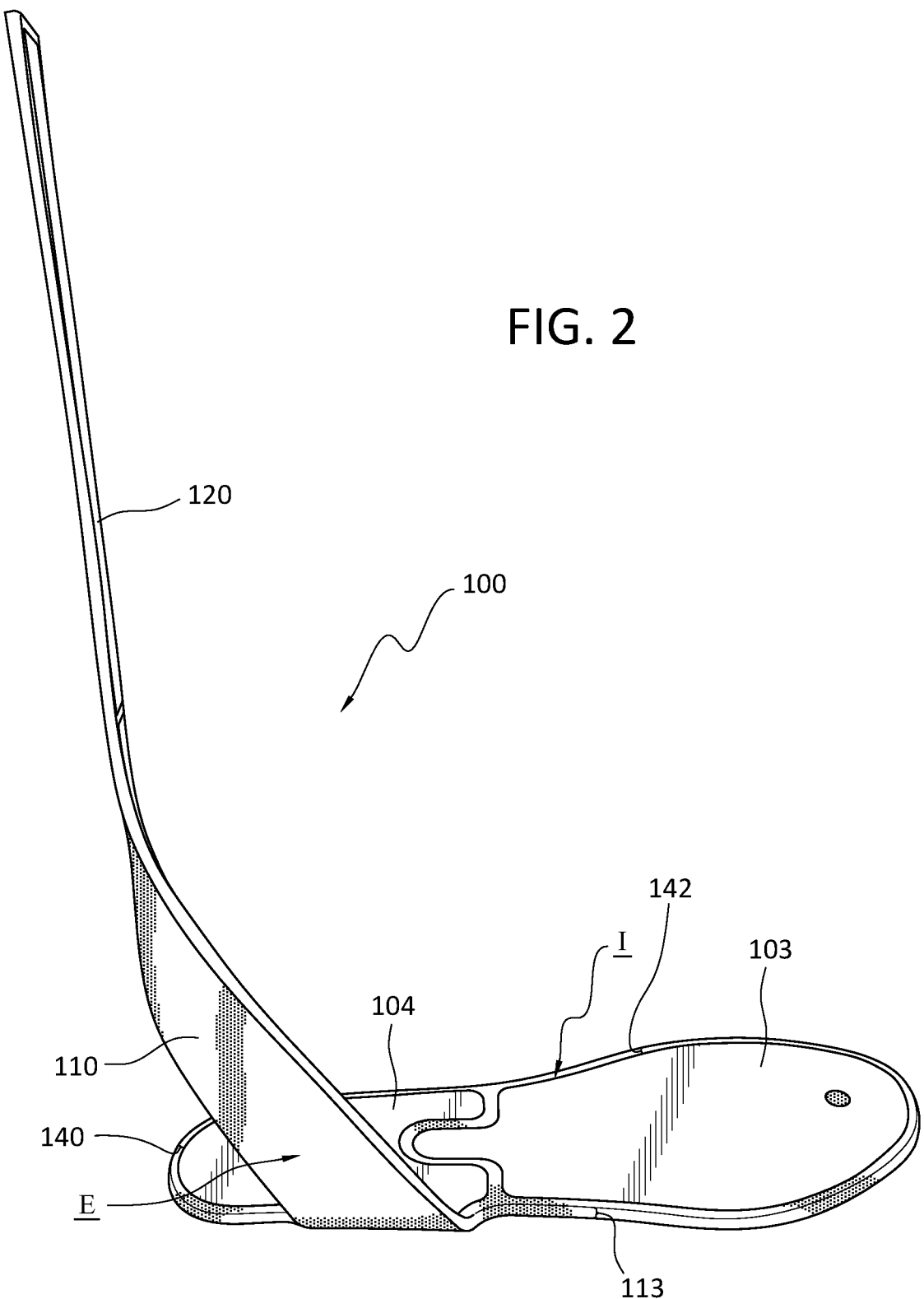
FIG. 2 is a second perspective view showing the first embodiment of FIG. 1.
Figure 3:
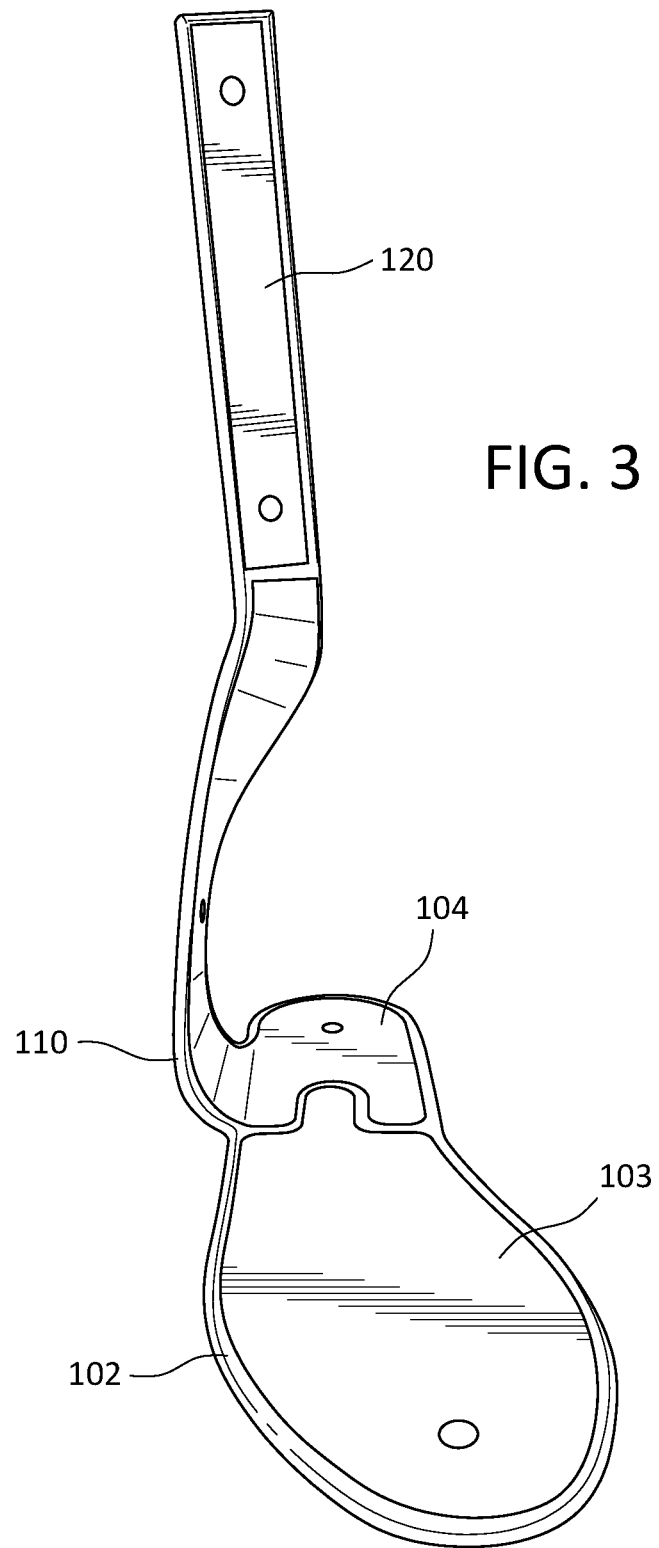
FIG. 3 is a third perspective view showing the first embodiment of FIG. 1.

FIGS. 1-3 illustrate an exemplary AFO 100 that forms a monolithic structure comprising at least two different material components 101, 102. The first material component 101 includes at least one tape layer consisting of a continuous fiber-reinforced thermoplastic composite, and a second polymeric material component 102 surrounding at least in part the at least one tape layer and preferably consists of a thermoplastic material.

The at least one tape layer forms a reinforcement to the second polymeric material component. It can be strategically placed in vulnerable areas of the AFO 100, requiring enhanced flexibility, resiliency, strength, and energy return. For example, the first material component 101 comprises at least a first tape segment (or toe portion) 103 and a second tape segment (or heel portion) 104 spaced apart and secured by the second polymeric material component 102. A periphery or peripheral edge 128 of the first tape segment 103 is surrounded by the second polymeric material component 102. Likewise, a periphery or peripheral edge 138 of the second tape segment 104 is surrounded by the second polymeric component 102.

A periphery 130 of the AFO 100 is defined by the second polymeric material component 102. The first material component 101 is spaced by a distance 142 away from the periphery 130, which generally corresponds in shape to the at least part of the peripheral edge 128 of the first tape segment 103. The first material component 101 is also spaced by a distance 140 away from the periphery 130, which generally corresponds in shape to the at least part of the peripheral edge 138 of the second tape segment 104. By defining the peripheral edges 128, 138 with thermoplastic material, as opposed to the tape segments, a clinician can easily adapt the definitive AFO 100 into a shape more accommodating to an individual user without sacrificing or tampering with fiber-reinforced tape segments. Such adaptation may include heating and remolding the thermoplastic material or trimming it to a predetermined size.

To assure adaptability of the tape segments, which may themselves have different properties according to different layers, such as more than one layer and how they are oriented relative to one another, the first tape segment 103 defines an interlocking feature 126 through or into which the second polymeric material component 102 extends and interlocks with the first tape segment 103. Advantageously, the resin material of the first material component 101 is thermally bonded to the second polymeric material component 102, with the interlocking being maintained by the second polymeric material component by bonding to the first material component.

The second polymeric material component 102 may be completely overmolded about the first material component 101, or partially. For example, an exterior surface E of the AFO 100 may be defined by the second polymeric material component 102, so that the material selection of the second polymeric material component 102 is selected to offer durability to contact wear and tear by the sole or exterior surface E of the AFO 100, whether on the ground or within a shoe. The first material component 101 may not possess the same level of toughness accorded to the thermoplastic material of the second and/or thickness. Likewise, an interior surface I may be defined by the second polymeric material component 102, the first material component 101 defined within or encased in a thickness 113 of the second polymeric material component 102. The ability to mold the thermoplastic material about the first material component 101 enables the adaptation of thermoplastic material of the second polymeric material component to have different thicknesses according to locations of the AFO 100 to adapt the AFO 100 for better durability, flexibility, or other desirable characteristics enabled by the thermoplastic material.

The AFO 100 may include a heel portion 104, an ankle portion 106, an ankle strut 108, and a spiraling lower leg portion (or spiral portion) 110, forming a first continuous tape segment 132 by the first material component 101 without interruption and shaped in a three-dimensional configuration and having sections adapted to accommodate human anatomy about a heel, ankle and lower leg of a user.

According to the injection molded or generally "molded" manner of the AFO 100, the AFO 100 may assume more complicated shapes on a more consistent basis and may have reinforced sections that are nonetheless molded over (i.e., reinforced sections of the first material component comprising at least two layers of the tape segments with the second polymeric material component molded over the first material component). For example, the AFO 100 has a portion 106 extending from a lateral side of the heel portion 104 and spirals from the lateral side to the posterior side adapted to a posterior lower leg. A second continuous tape segment 134 overlaps at least part of the first continuous tape segment 132. The second continuous tape segment 134 shares at least in part a peripheral contour with the first continuous tape segment 132.

The second continuous tape segment 134 may extend over the first continuous tape segment 132 at least over the ankle portion 106, thereby making the ankle portion 106 relatively thicker than areas of the first continuous tape segment 132 without the second continuous tape segment 134 extending thereover. The first and second continuous tape segments 132, 134 may each have different thicknesses and generally comprise different layers of the continuous fiber-reinforced thermoplastic composite, or such layers being oriented differently, as exemplified in FIGS. 4A and 4B.

Figure 4A:
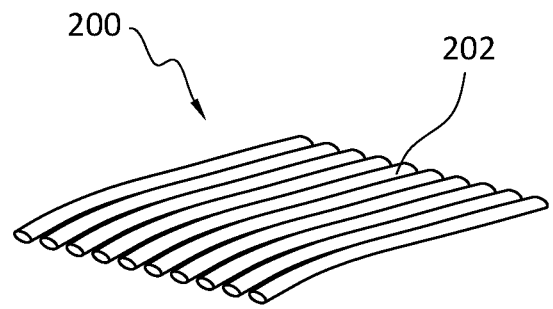
FIG. 4A is a perspective view of an embodiment of a tape layer consisting of a continuous fiber-reinforced thermoplastic composite arranged unidirectionally.

FIG. 4A illustrates an exemplary layer 200 of fibers 202 arranged unidirectionally.

Alternatively, the first and second continuous tape segments 132, 134 may have different types of reinforcing fibers (long or short, and/or diameters; different materials), and each has a thermoplastic resin matrix. A third continuous tape segment 136 may extend over the second continuous tape segment 134 and defines a peripheral contour similar or the same in part as a peripheral contour of the second continuous tape segment 134. The tape segments themselves may likewise be oriented relative to one another according to desired characteristics, such as flexibility, flexural modulus, etc.

According to the AFO 100 of FIGS. 1-3, a monolithic structure comprises at least one tape segment, including a toe tape segment 103, a heel tape segment 104, and a posterior (or leg support) tape segment 120, wherein each of the toe tape segment 103, the heel tape segment 104, and the posterior tape segment 120 define a different peripheral contour. The heel tape segment 104 has at least two layers of tape segments overlapping one another at least in part. The second polymeric material component 102 encases at least one tape segment so that the thermoplastic material of the second polymeric material component 102 is molded over the first material component 101, and defines interior and exterior surfaces I, E of the AFO 100.

The first material component comprises a base resin, preferably a thermoplastic selected from a polyolefin, polyester, and nylon group. The first material component comprises a plurality of continuous fibers selected from a group consisting of E-glass, aramid, and carbon fibers. A base resin has lower strength and/or stiffness than the plurality of continuous fibers. The combination of the fibers and the base resin forms a continuous fiber-reinforced thermoplastic (CFRTP). This combination yields end products of very high strength and stiffness, excellent fatigue and impact resistance, and lightweight. The reinforcement can be applied specifically, as described, to increase the molded article's strength, stiffness, and impact performance. These CFRTP materials exhibit very low shrinkage and thermal expansion.

A commercial example of a CFRTP is Polystrand, provided by PolyOne of Englewood, CO. In the process of overmolding the CFRTP with a thermoplastic (in addition to the base resin), a CFRTP is preheated and inserted into a tool and/or mold. A solid thermoplastic resin is fed into an injection molding device, heated, and conveyed to the CFRTP in the tool or mold. According to the mold, the heated thermoplastic resin is molded about the CFRTP, compressed, and cooled into shape.

Figure 4B:
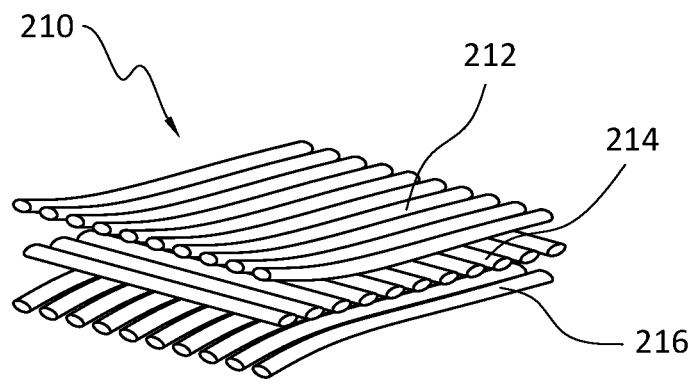
FIG. 4B is a perspective view of another embodiment of a laminate consisting of a plurality of tape layers of continuous fiber-reinforced thermoplastic composite arranged in two directions.

According to an embodiment of the AFO, the first material component comprises a plurality of layers 210, including at least the first and second tape layers 212, 214, as illustrated in FIG. 4B. The first and second tape layers 212, 214 are distinguishable based on at least one of the following criteria: fiber orientation, fiber location, and fiber volume. For example, the first tape layer 212 has a plurality of fibers arranged in a single first direction or unidirectionally. The second tape layer 214 has a plurality of fibers arranged in a single second direction unidirectionally. The first and second tape layers 212, 214 form a laminate configuration, such that the first and second tape layers 212, 214 combine to form the first material component.

The laminate configuration comprises stacking the first and second tape layers 212, 214 in the desired orientation and consolidating them by applying heat and/or pressure. The first direction of the plurality of fibers of the first tape layer 212 is arranged at an angle greater than 0 degrees relative to the second direction of the plurality of fibers of the second tape layer 214. For example, the first direction may be oriented 90 degrees relative to the second direction.

A third tape layer 216 may be laminated with the first and second tape layers 212, 214 to form the second polymeric material component 102. The first and the third tape layers 212, 216 have fibers oriented in a 0-degree orientation, and the second tape layer 214 is oriented in a 90-degree orientation relative to the first and the third tape layers 212, 216. As a result, the first material component 101 has a greater flexural modulus in a direction along which the first and third tape layers 212, 216 are arranged parallel. The first and third layers 212, 216 may have their fibers arranged along a length in direction A of the ankle strut 108 to increase thereby the flexural modulus of ankle strut 108 in the direction. In contrast, the flexural modulus in the direction A is greater than a direction transverse or aligned with the fibers of the second tape layer 214.

The first material component may have many tape layers according to desired properties, and such layers may be oriented likewise according to desired properties.

Returning to the AFO 100, the first layer may have unidirectional fibers aligned in direction A1 of the ankle strut 108 such that the ankle strut 108 has a greater flexural modulus in direction A1 than in a direction A2 transverse or oriented 90 degrees to direction A1. Likewise, the first layer has unidirectional fibers aligned in a direction B of a spiral portion 110 such that the spiral portion 110 has a greater flexural modulus in direction B than in a direction transverse or oriented 90 degrees to direction B.

The first layer has unidirectional fibers aligned in a direction C of a posterior portion 112 such that the posterior portion 112 has a greater flexural modulus in direction C than in a direction transverse or oriented 90 degrees to direction C, the posterior portion 112 is oriented in a generally straight configuration. In addition, the first layer has unidirectional fibers that may be aligned in a direction D of a line of progression of the toe and heel portion 103, 104 such that the toe or heel portion 103, 104 has a greater flexural modulus in the direction D than in a direction transverse or oriented 90 degrees to direction D.

As shown in FIGS. 1-3, and particularly FIG. 1, the AFO 100 includes a footplate 105 having a line of progression extending from a heel portion 104 to an ankle portion 106 to a toe portion 103 of the footplate 105. A resilient leg support 107 has first and second end portions (ankle strut and posterior portion) 108, 112 with a middle spiral portion 110 therebetween. The first end portion (ankle strut) 108 is inseparably connected to the footplate 105. The leg support 107 and the footplate 105 are integrated by the thermoplastic base resin of the second polymeric material component 102. The footplate 105 and the leg support 107 may share a least one tape segment 104 that extends across at least an ankle strut 108 of the AFO 100.

The AFO 100 wherein the at least one layer of continuous fiber-reinforced thermoplastic comprises first or toe and second or heel tape segments 103, 104 spaced apart by a distance 115 exposing a thermoplastic material component 114 of the second polymeric material component 102, which integrally secures the first and second tape segments 103, 104 together.

The first and second tape segments 103, 104 may have first and second interlocking sections 122, 124 defined by complementary shapes. For example, the first interlocking section 122 has a protruding shape, and the second interlocking section 124 defines a recess adapted to the protruding shape of the first interlocking section 122 with a distance 115 therebetween formed by the thermoplastic material component 114.

Figure 5:
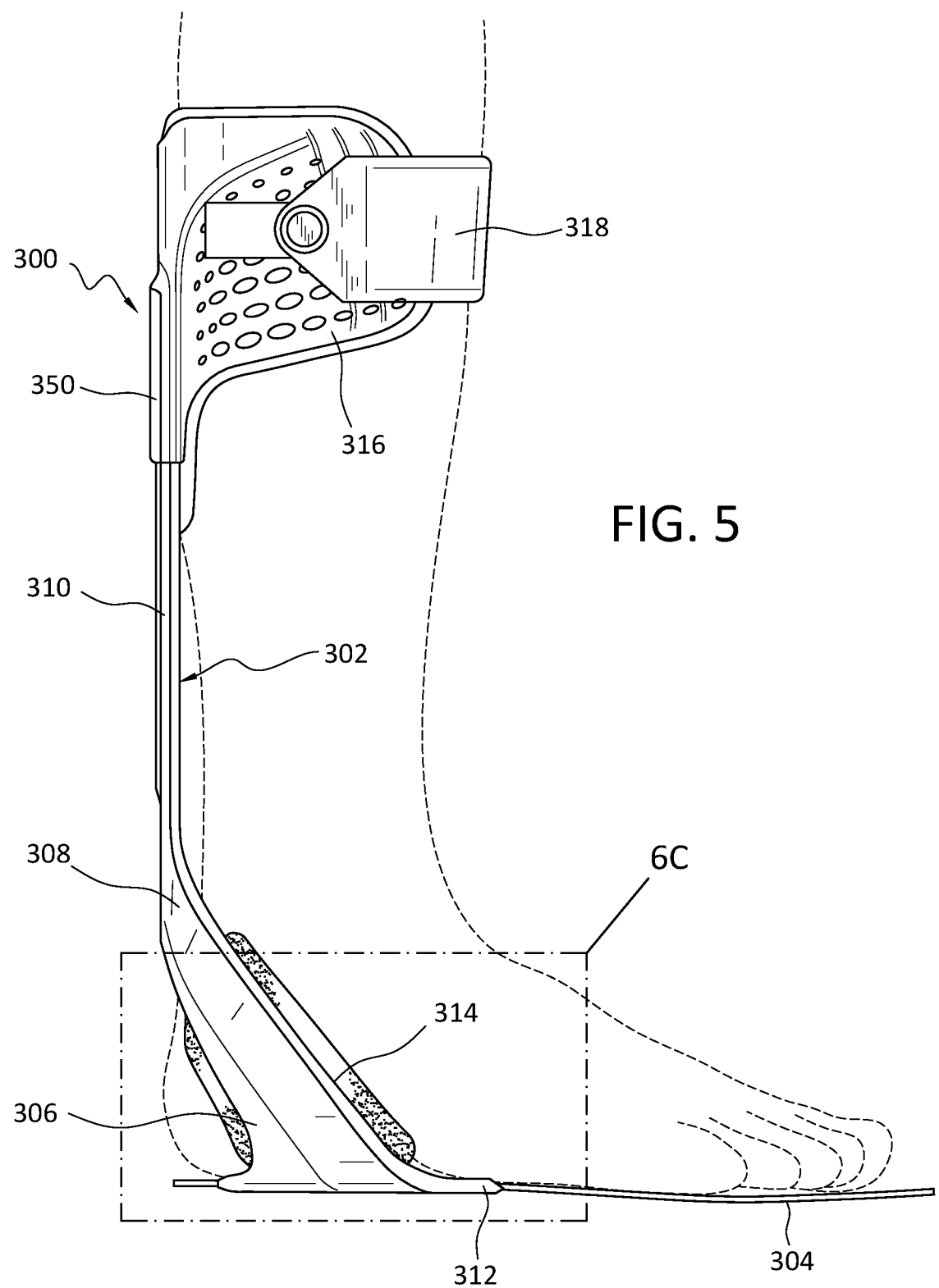
FIG. 5 is a side elevational view of another embodiment of an ankle-foot orthosis.

FIG. 5 illustrates an AFO 300 constructed consistent with the aforementioned methods of the preceding embodiments. The AFO 300 includes a body 302 continuously and interruptedly formed with a footplate 304, an ankle portion 306, a spiral portion 308, and an upper leg portion 310. The footplate 304 is secured to the ankle portion 306 by a reinforced connection 312, and a pad 314 may be provided along an interior surface of the ankle portion 306. In addition, the AFO 300 includes a leg cuff 316 with a height sizing assembly 350, including a strap 351 for circumferentially securing the leg cuff 316 and strap 318 about the user's lower leg.

Figure 6A:
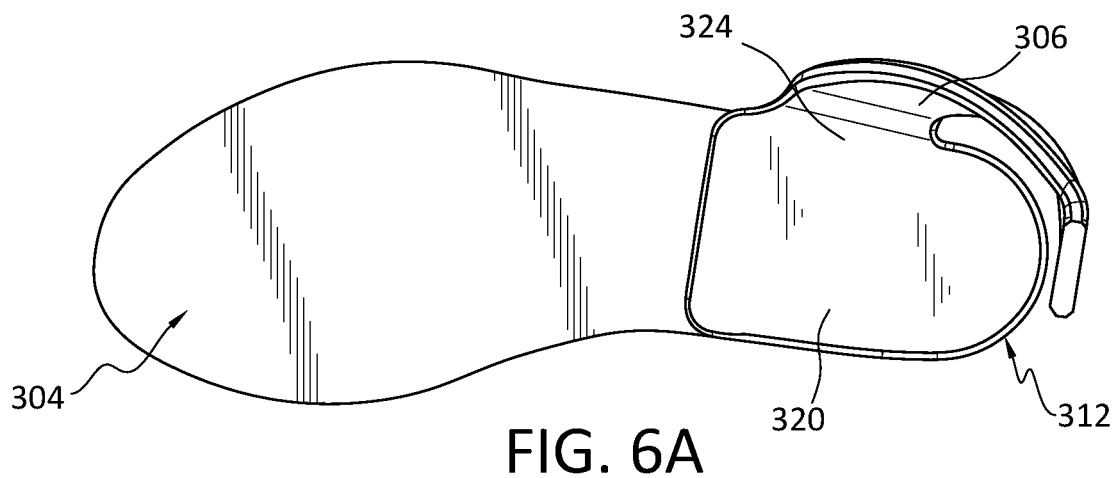
FIG. 6A is a bottom plan view of the ankle-foot orthosis of FIG. 5.
Figure 6B:
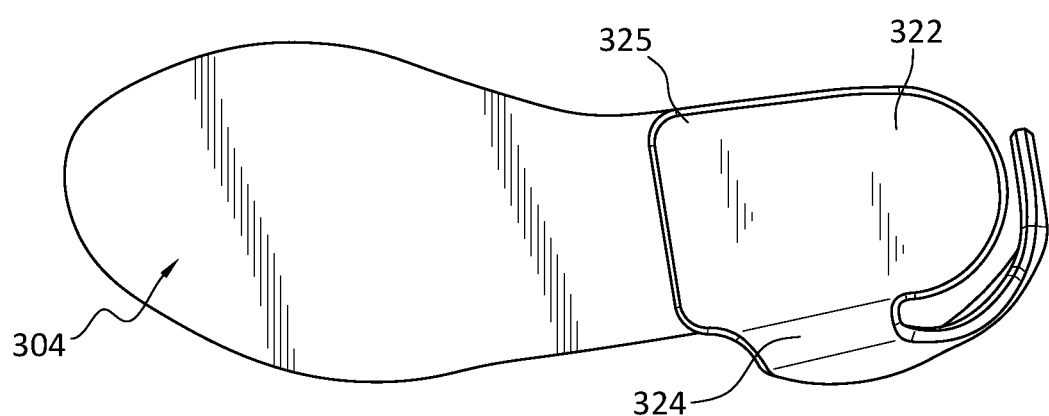
FIG. 6B is a top plan view of the ankle-foot orthosis of FIG. 5.
Figure 6C:
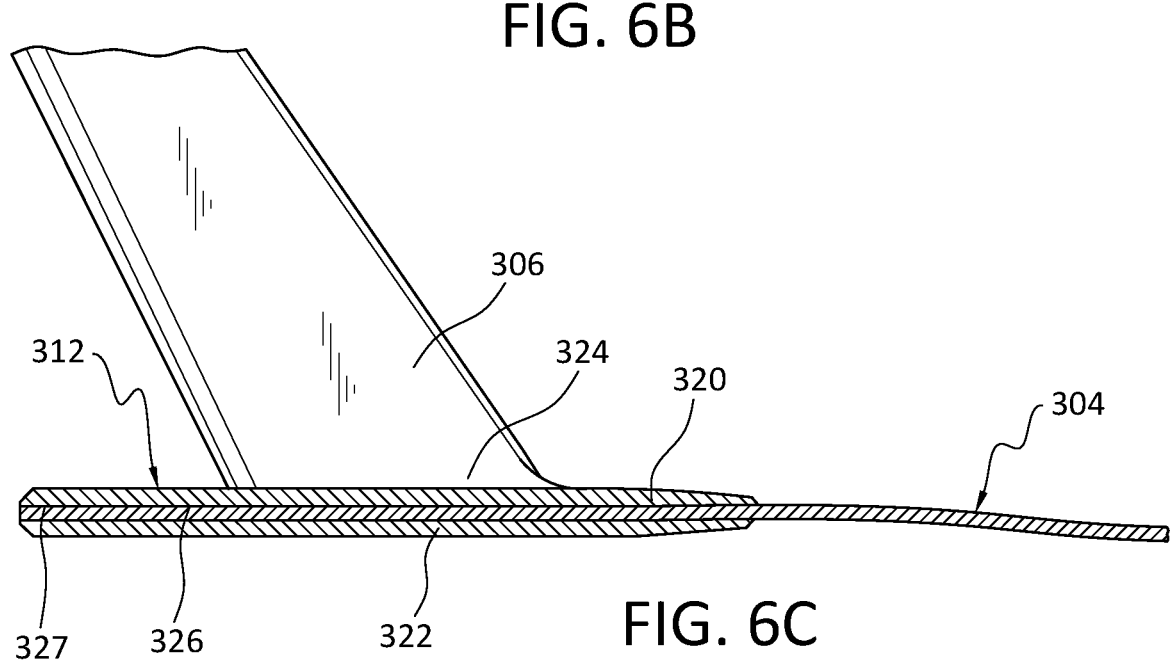
FIG. 6C is a sectional elevational view showing an inside of the interface of the ankle portion to the footplate in the ankle-foot orthosis of FIG. 5.

FIGS. 6A-6C exemplify an embodiment of the reinforced connection 312. The reinforced connection 312 comprises a CFRTP section extending over the footplate 304, and defined by plantar and dorsal segments 320, 322 extending from the ankle portion 306 from a joined segment 324 and bifurcating to sandwich the footplate 304. The reinforced connection 312 preferably forms or corresponds to a section of the outer periphery 325 of the footplate 304 along the medial, lateral, and posterior sides thereof. The footplate itself may be constructed from CFRTP either partially or entirely.

The plantar and dorsal segments 320, 322 preferably have a combined thickness greater than the footplate 304 and is defined by multiple layers of the CFRTP. For example, the heel portion 327 of the footplate 304 is covered along its plantar and dorsal sides with the plantar and dorsal segments 320, 322. Alternatively, the AFO 300 may be arranged so that only one surface of the footplate (i.e., plantar or dorsal) is partially or completely covered by CFRTP extending from the ankle portion 306. A remainder of the footplate 304 not covered with one of the plantar or dorsal segments 320, 322 may be substantially more flexible than at the reinforced connection, thereby providing greater comfort and gait assistance of the footplate to the user.

The reinforced connection 312 significantly increases the strength of the interface of the footplate and the ankle portion, as this is an area of an AFO 300 most susceptible to fracture. By enhancing the interface of the footplate to the ankle portion, with at least one of the plantar and dorsal segments 320, 322, the AFO 300 will be significantly reinforced without the need for supplementary connections of the footplate to the rest of the AFO 300 body.

Figure 7:
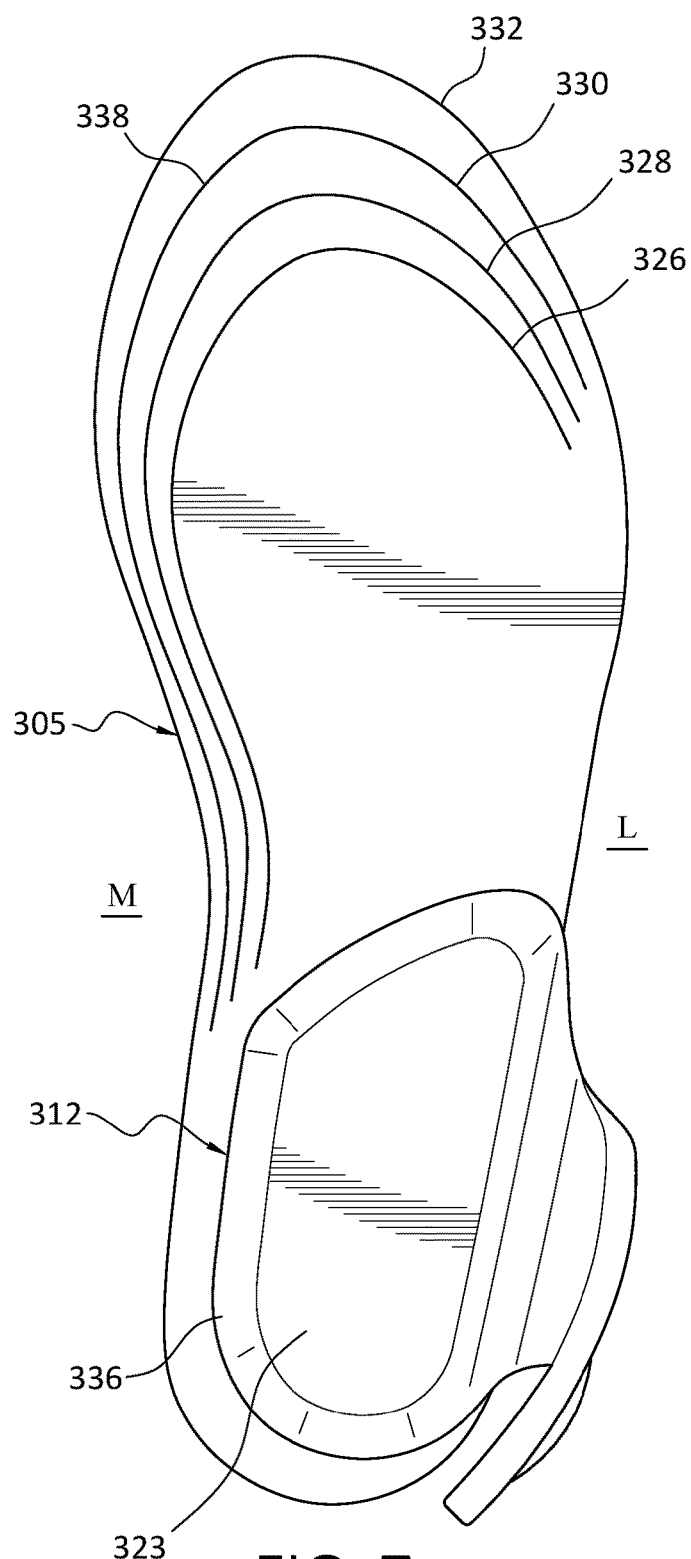
FIG. 7 is a top plan view of a variation of the ankle-foot orthosis in FIG. 5.

FIG. 7 shows a variation of a reinforced connection 312, such that at least one of plantar and dorsal segments 320, 322 extends to an inner periphery 336 of a footplate 305. The footplate 305 is trimmable, among a plurality of sizes 326, 328, 330, 332. The footplate 305 may depict trim lines 338 that enable clean cutting of the size of the footplate. While the footplate may include a CFRTP construction, it is substantially thinner than the reinforced connection 312, and sufficiently thin to permit trimming by a clinician.

The reinforced connection 312 may correspond to the periphery of the smallest size 326 of the footplate 305, and extend to its periphery inner 336 on the medial side (M) of the AFO 300, as the reinforced connection 312 may be too stiff, thick, and rigid to easily and reasonably cut when sizing the footplate 305. As the reinforced connection preferably extends from a lateral side (L) of the ankle portion, the reinforced connection 313 will correspond to the periphery 336 of the smallest size 326 and the footplate 305, in general, on the lateral side (L) of the AFO 300.

The footplate 305 may be constructed solely from CFRTP or partially from CFRTP; however, in this preferred embodiment, the footplate 305 is only constructed from CFRTP and is partially overmolded with a thermoplastic 323, such as along the peripheral edges of the footplate 305, thereby enabling easy trimming or sizing of the footplate for the individual needs of a user.

Figure 8:
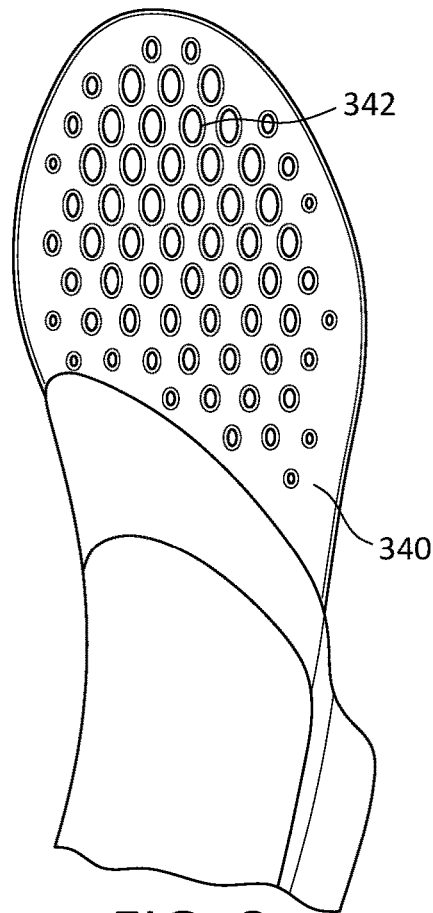
FIG. 8 is a top plan view of another variation of the ankle-foot orthosis of FIG. 5.

FIG. 8 illustrates a variation of a footplate 340 defining a plurality of perforations 342 arranged in a predetermined pattern to improve the breathability of a user's foot and the increased flexibility of the AFO 300 corresponding to the region of at least a toe portion of the footplate 340.

Figure 9:
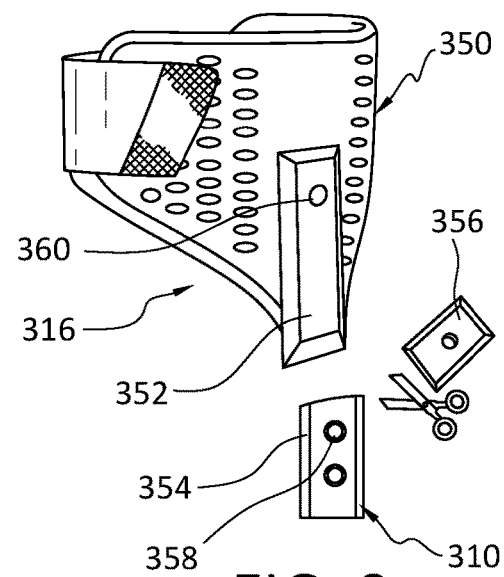
FIG. 9 is a sectional perspective view of an ankle cuff of the ankle-foot orthosis of FIG. 5.

FIG. 9 depicts the height sizing assembly 350 in the AFO 300 of FIG. 5. The height sizing assembly 350 includes the leg cuff 316, which defines a channel 352, which may be formed from a thickness of the leg cuff 316 or a portion of the leg cuff 316 protrudes slightly outwardly. The channel 352 is configured and dimensioned to accommodate a proximal end 354 (the distal end portion connecting the spiral portion) of the leg portion 310. The proximal end 354 is severable by a clinician to reduce the height of the leg portion 310, such that the proximal end 354 can be trimmed to produce a discardable severed end 356. The proximal end 354 may form a plurality of slots 358 along the height thereof that can coincide with a slot 360 on the leg cuff 316 for coupling with a fastener, push-button or other suitable connection means.

Figure 10:
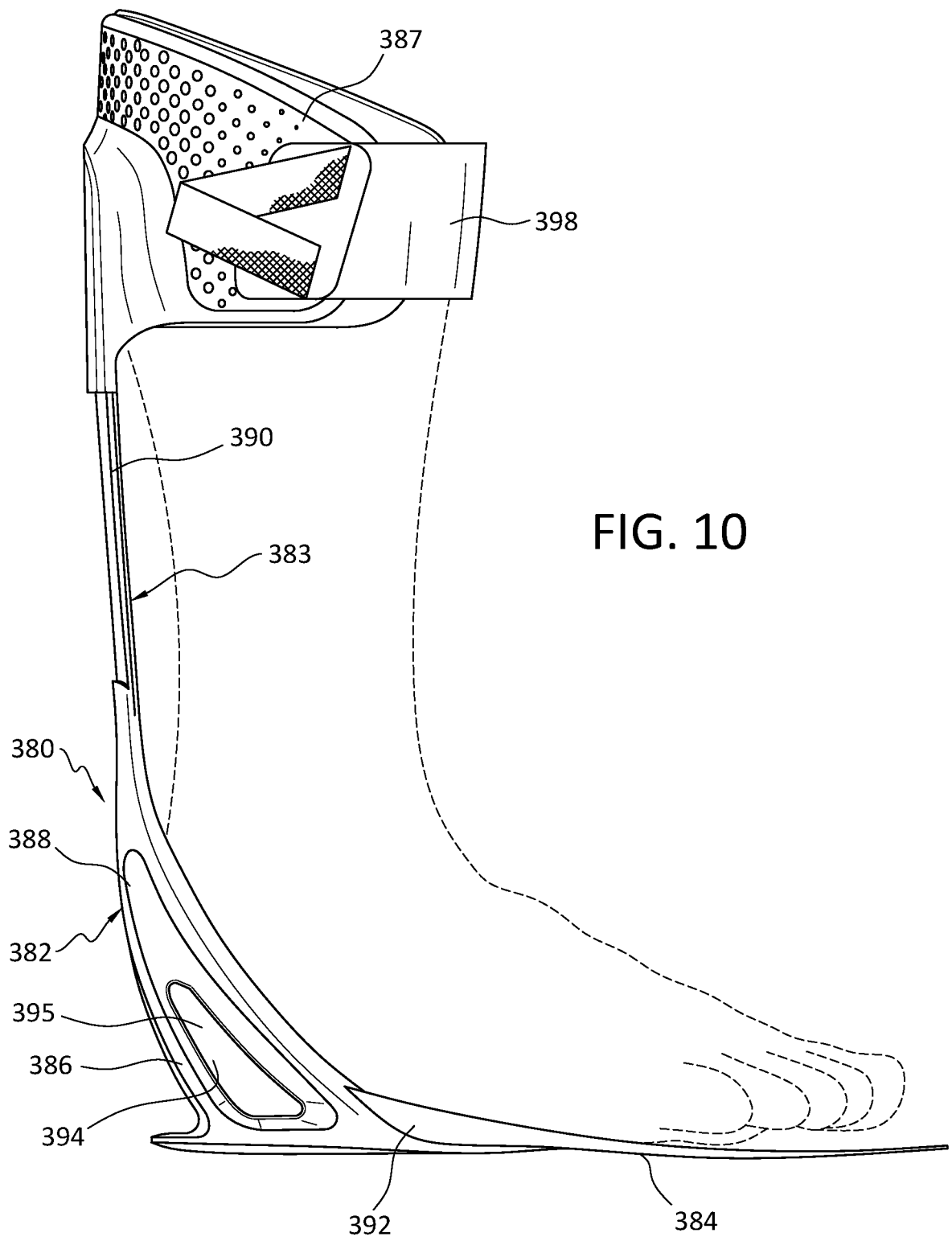
FIG. 10 is a side elevational view of another embodiment of an ankle-foot orthosis.

FIG. 10 illustrates another AFO embodiment 380. The AFO 380 defines a body 382, a footplate 384, an ankle portion 386, a spiral portion 388, and a leg portion 390. The leg portion 390 includes a cuff 387 and corresponding strap 398. FIG. 10 illustrates the body as forming an ankle opening 394, adapted to receive a reinforcement plate or element 395 to strengthen the ankle portion 386 further. The reinforcement plate 395 may be a metal or composite plate adapted to enhance the rigidity and durability of the ankle portion 386 and can be optionally applied to the AFO 380.

FIGS. 11A and 11B depict the AFO 380 as forming a reinforcement assembly 383 for the leg portion 390, enabling a clinician to increase or decrease the stiffness of the leg portion 390 according to different predetermined stiffnesses. The reinforcement assembly includes upper and lower retainers 391, 393 formed by the body 382 into which a reinforcement insert 396 may be inserted and retained thereby. The retainers 391, 393 may form slots 397 into which ends of the reinforcement insert 396 are inserted, and the reinforcement insert 396 abuts and is flush with the leg portion 310. The inner surface (facing toward the user) of the leg portion 310 may define a recess 389 configured so the reinforcement insert 396 is flush with the remainder of the inner surface of the leg portion, so as not to protrude beyond the inner surface of the AFO 380, thereby creating pressure points. Fasteners 399 may be provided to secure the insert to the body 382 of the AFO 380.

A set of inserts may comprise inserts of different stiffnesses so that a clinician can adapt the AFO according to stages of care or modify the AFO according to a user's specific needs. The inserts may be similarly formed as the AFO body, albeit configured and dimensioned to be retained by the AFO body. Alternatively, the inserts may be formed by different materials sufficient, however, to allow the clinician to adapt the stiffness of the leg portion.

The footplate 384 may form an interior surface to a footbed 385, with a concave shape 392 to better accommodate the foot of a user. The concave shape 392 also imparts increased stiffness into the footbed 385. The footbed 385 may be formed by a thickness of the CFRTP, and is in contradistinction to conventional footplates that typically have a flat footbed or inner surface. The concave shape 392 can better fit a user and create a more comfortable experience.

The ankle portion 386 may form an opening along which, on the interior side, a pad or metal insert may be provided to enhance padding or stiffness at the ankle portion 386 of the AFO 380. The interior side (not shown) may have a recess similar to the reinforcement system for accommodating the pad or insert without protruding beyond the remainder of the interior side of the ankle portion, as in FIG. 10.

Figures 12A, 12B, 12C:
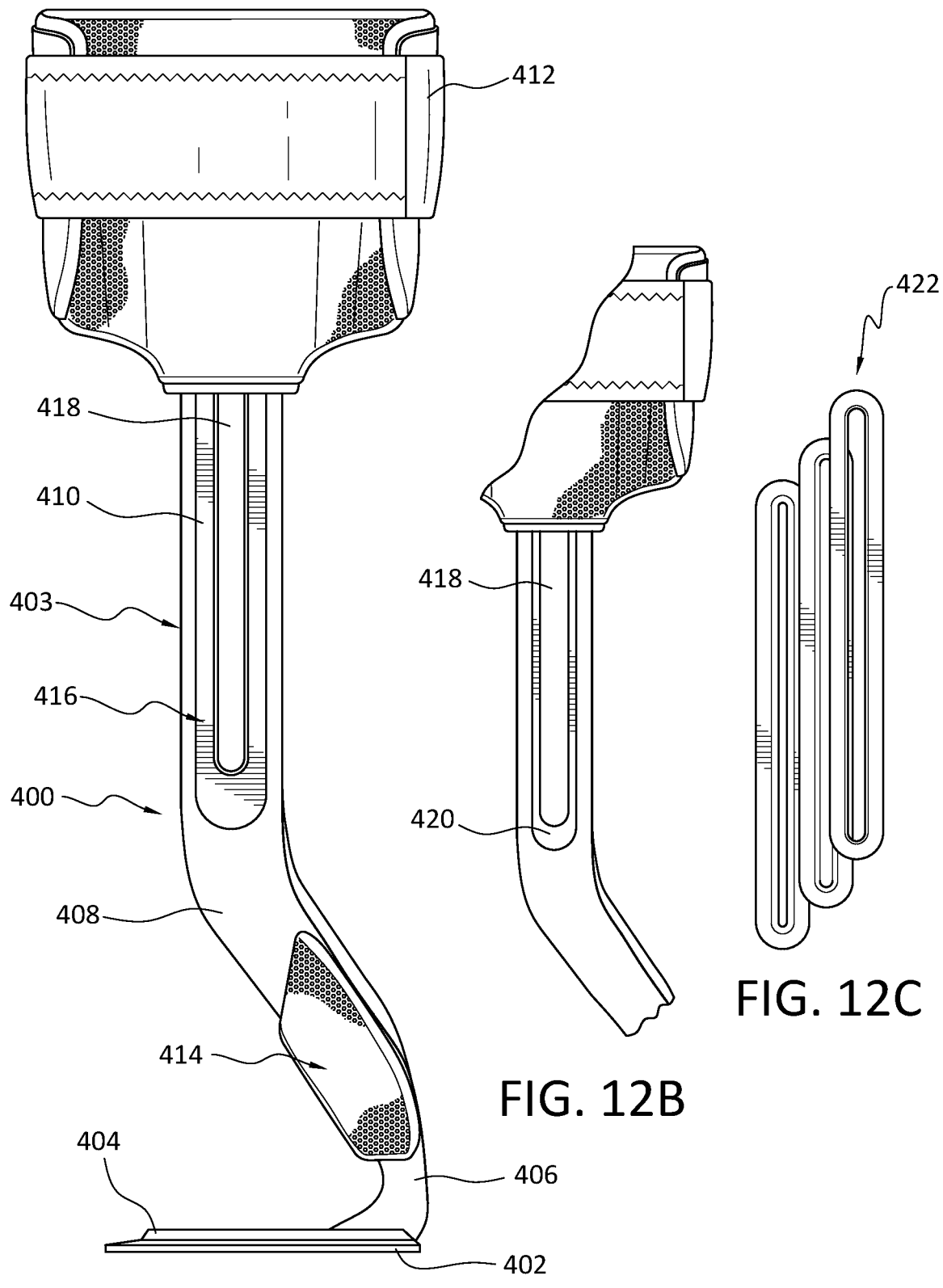
FIG. 12A is a frontal elevational view of another embodiment of an ankle-foot orthosis.
FIG. 12B is a sectional elevational view of FIG. 12 showing the ankle-foot foot orthosis with a reinforcement insert removed.
FIG. 12C is an exemplary view of a set of reinforcement inserts for insertion into the ankle-foot orthosis of FIG. 12A.

FIG. 12A exemplifies another AFO embodiment 400. This AFO 400, like the others, includes a continuously formed body 402 with a footplate 404, an ankle portion 406, a spiral portion 408, and a leg portion 410. A cuff 412 secures the proximal end of the leg portion 410. A padding 414 may be applied to the frame of the AFO 400, such as at the spiral portion 408.

Figure 13A:
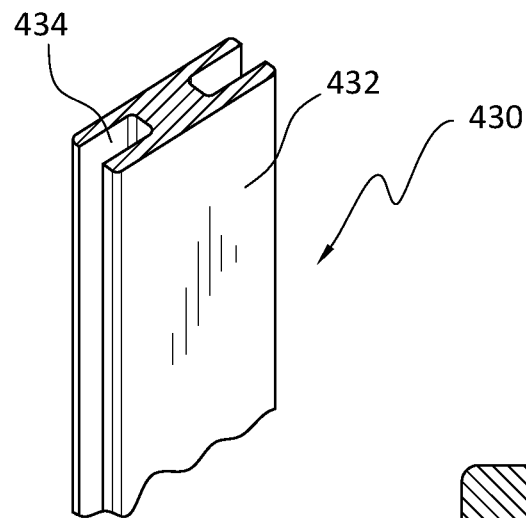
FIG. 13A is a sectional view of a feature for a reinforcement insert for use with the ankle-foot orthosis of FIG. 12A.
Figure 13B:
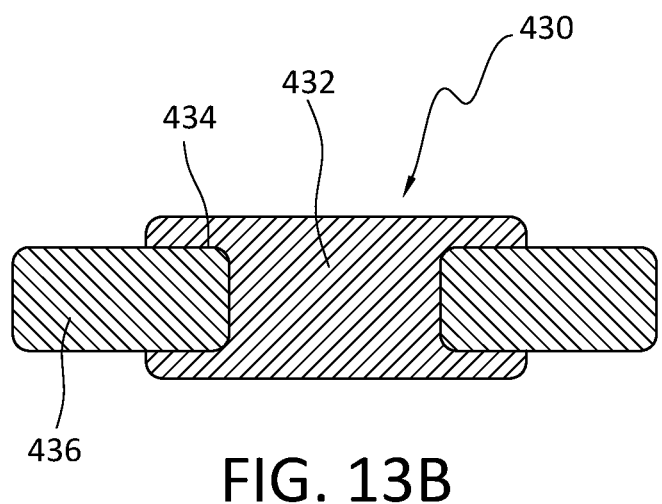
FIG. 13B is an exemplary sectional view showing the reinforcement insert installed on an ankle-foot orthosis.

The AFO 400 has a reinforcement system 403, similar to the reinforcement system in the AFO 380. In this embodiment, the inserts 416, 422 are adapted to snugly fit the leg portion 410, in a recess 420 and/or as shown in FIGS. 13A and 13B. For example, an insert 432 may have side channels 434 adapted to the size of a wall thickness 436 of the leg portion 410, and fit within an opening 418 formed by the leg portion 410. As with the preceding embodiment of the AFO 380, a set of inserts 416, 422 of different stiffnesses may be provided.

Figure 14:
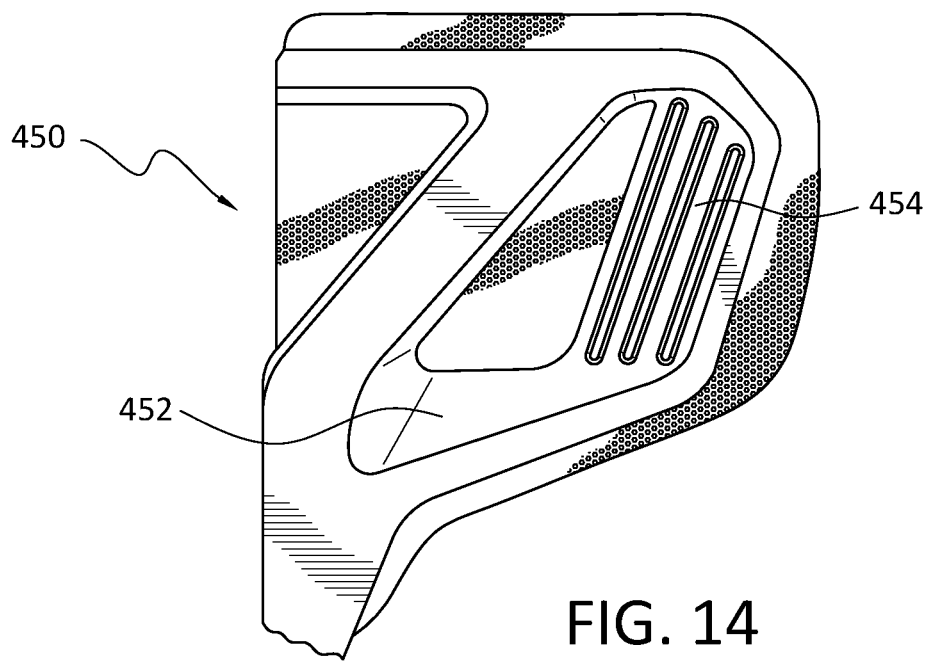
FIG. 14 is a sectional view of a variation of a leg cuff according to any of the ankle-foot orthosis embodiments.

FIG. 14 shows a cuff 450 that may be provided in any of the aforementioned AFO embodiments with a structure 452 with a forward trimmable feature 454 to reduce the circumference of the cuff when coupled with a strap.

Figure 15:
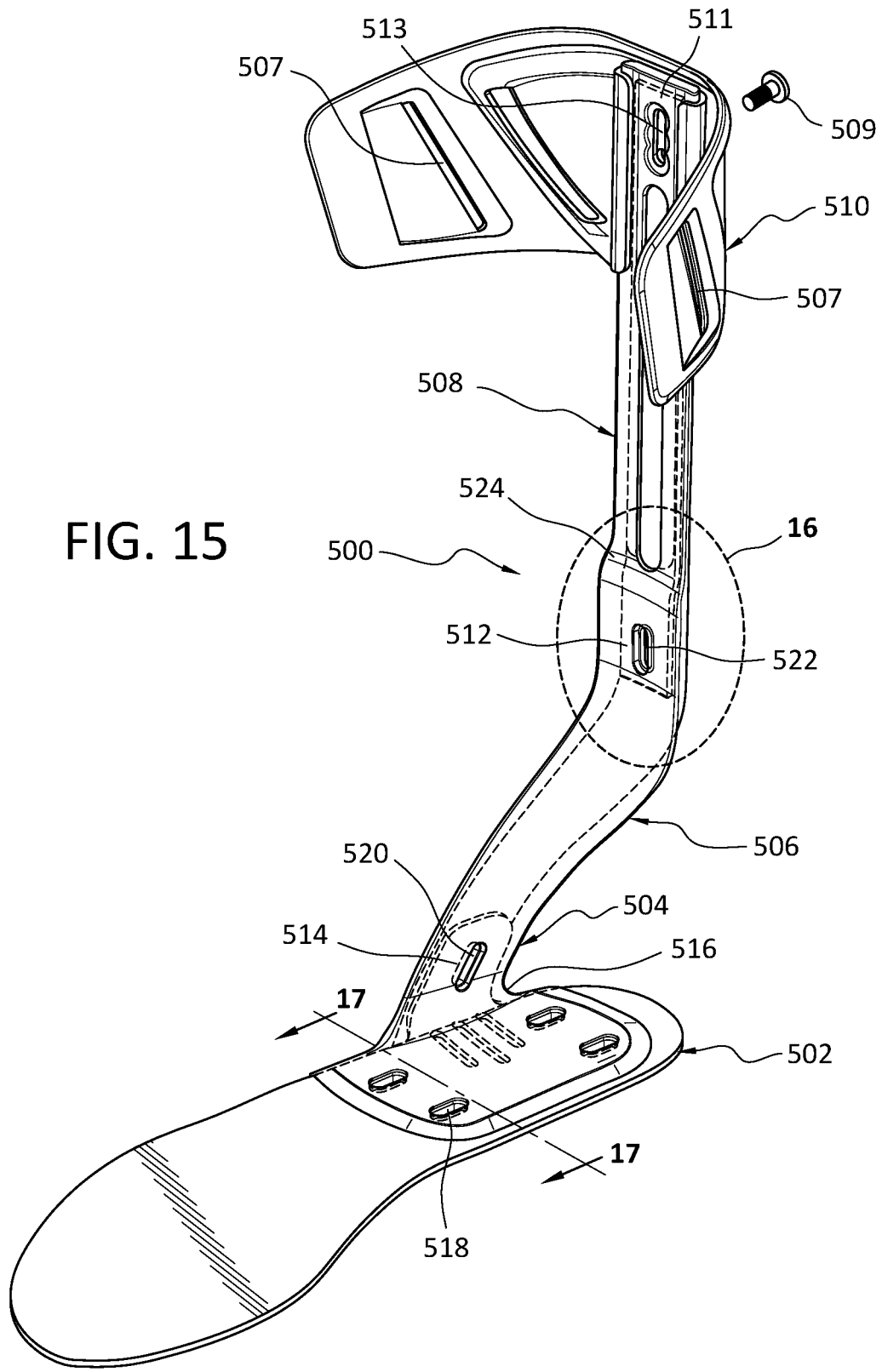
FIG. 15 is a perspective view of another embodiment of an ankle-foot orthosis embodiment.
Figure 16:
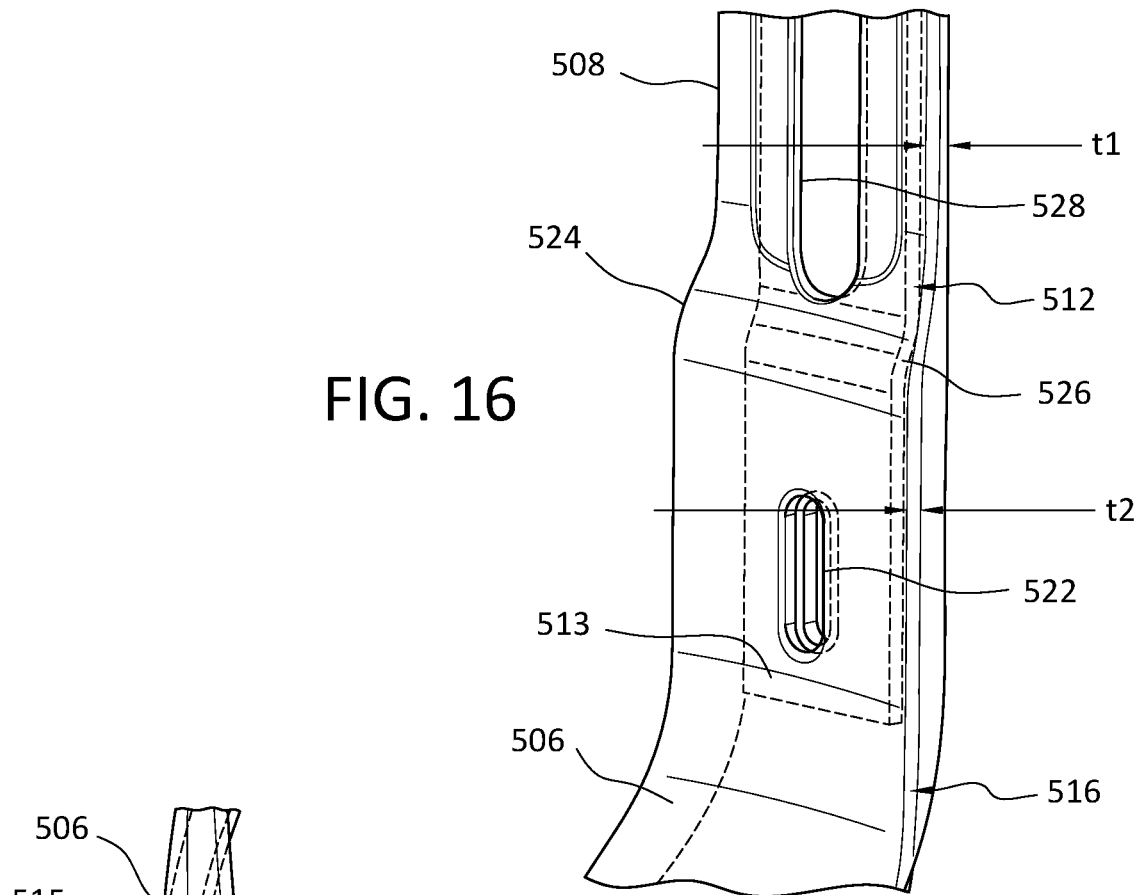
FIG. 16 is a detailed view taken from section 16 in FIG. 15.
Figure 17:
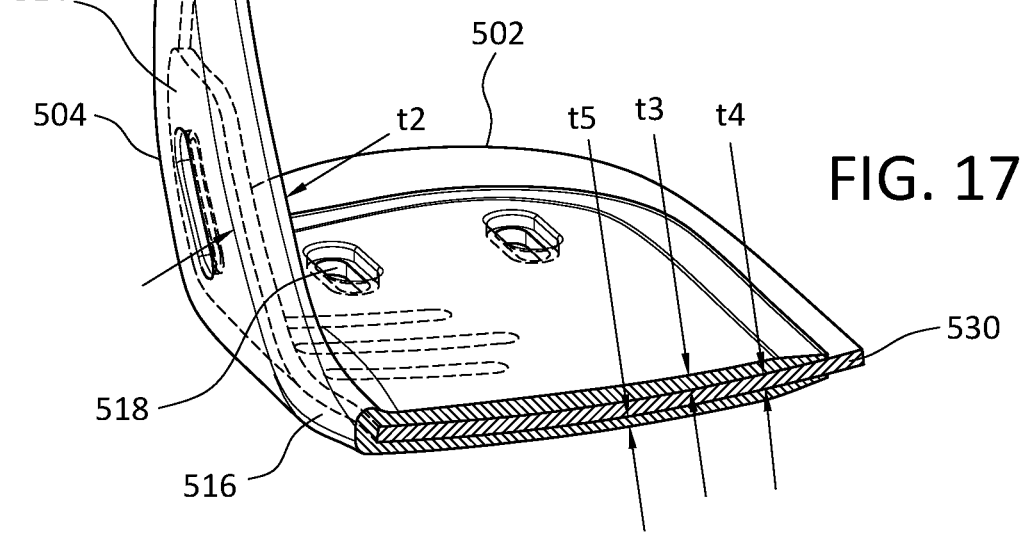
FIG. 17 is a sectional view taken along line 17-17 in FIG. 15.

FIGS. 15-17 illustrate another embodiment of an AFO 500. As with the embodiment of FIG. 1, the AFO 500 defines a footplate 502, an ankle strut 504 extending from the footplate 502, a spiral portion 506 extending from the ankle strut 504, and a posterior or leg portion 508. The spiral portion 506 extends from the ankle strut 504 to the leg portion 508. An adjustable cuff 510 extends at an end portion 511 of the leg portion 508. The cuff 511 includes an adjustment feature 513 that permits a fastener or locking element 509 (e.g., bolt and nut, clamp, staple, rivet, etc.) to hold the cuff 510 in place at a certain height setting relative to the end portion 511 of the leg portion 508. The adjustment feature 513 allows the AFO 500 to accommodate users better and tailor the AFO 500 to specific dimensions.

The adjustable cuff 510 is configured to stabilize a user's limb and to adapt to the anatomy of the lower leg. The adjustable cuff 510 features one or more protrusions 507 to accommodate straps and fasteners to secure a user's leg. The one or more protrusions 507 also allow for improved breathability and introduce greater flexibility into the adjustable cuff.

As depicted in FIGS. 15 and 16, a reinforcement segment 512 of the CFRTP type mentioned in earlier embodiments extends along the leg portion 508 yet may terminate prior to or above the spiral portion 506 that does not include the reinforcement segment 512. The reinforcement segment 512 is embedded in a first thickness t1 of the leg portion 508 comprising polymeric material or thermoplastic matrix or base material, such as polypropylene or nylon, that surrounds the reinforcement segment 512. The spiral portion 506 may consist of the polymeric material 516 molded in the shape of the spiral portion 506, as depicted, thereby making the spiral portion sufficiently stiff. Because the CFRTP reinforcement segment 512 is embedded in the polymeric material 516, the reinforcement segment 512 bonds with the polymeric material 516 to create an integrated structure. The leg portion 508 may have a first thickness t1 and a transition section 524 leading to the spiral portion 506 that increases in thickness from the first thickness t1 to the second thickness t2 at the spiral portion 506. To accommodate the reinforcement segment 512 may define a bend 526 in the transition section 524 to place the end portion 513 of the reinforcement segment 512 into a central thickness of the polymeric material 516 in the spiral portion 506, thereby centered into the thickness t2. The end portion 513 of the reinforcement segment 512 defines a slot 522 through which the polymeric material 516 extends to interlock the reinforcement segment 512 with the spiral portion 506, and to hold the reinforcement segment 512 in place securely.

The reinforcement segment 512 may include features such as an elongate indent 528 to facilitate resiliency of the leg portion 508. It has been found that the reinforcement segment 512 attributes to spring back of the AFO 500 at the leg portion 508, particularly as formed by CFRTP since the polymeric material does not sustain resiliency over repeated use while the CFRTP construction does. Optionally the leg portion 508 may have or define a concave surface on the inner side or side facing the user to provide for greater comfort or facilitate resiliency of the AFO 500.

FIG. 17 illustrates the transition of the spiral portion 506 to the ankle strut 504 to the footplate 502. A reinforcement portion 514 of the footplate 502 extends into a lower portion 515 of the spiral portion 506, and is embedded into the polymeric material 516. The polymeric material 516, similarly as in FIG. 6C, extends over the footplate 502, and is formed as in preceding embodiments. A thickness t3 of the polymeric material 516 extends over the footplate 502 or footplate segment formed by CFRTP, such that the footplate 502 has a thickness t4, and another thickness t5 underlies the footplate, so the footplate 502 of CFRTP is integrated with the polymeric material 516. The thicknesses t4 and t5 may be the same or different depending on the stiffness or desired reinforcement and attachment of the footplate 502. As depicted, a slot 518 or a plurality of slots is formed through the polymeric material 516 and footplate 516 for receiving a plug for an insert, as described in FIGS. 18 and 19.

Figure 18:
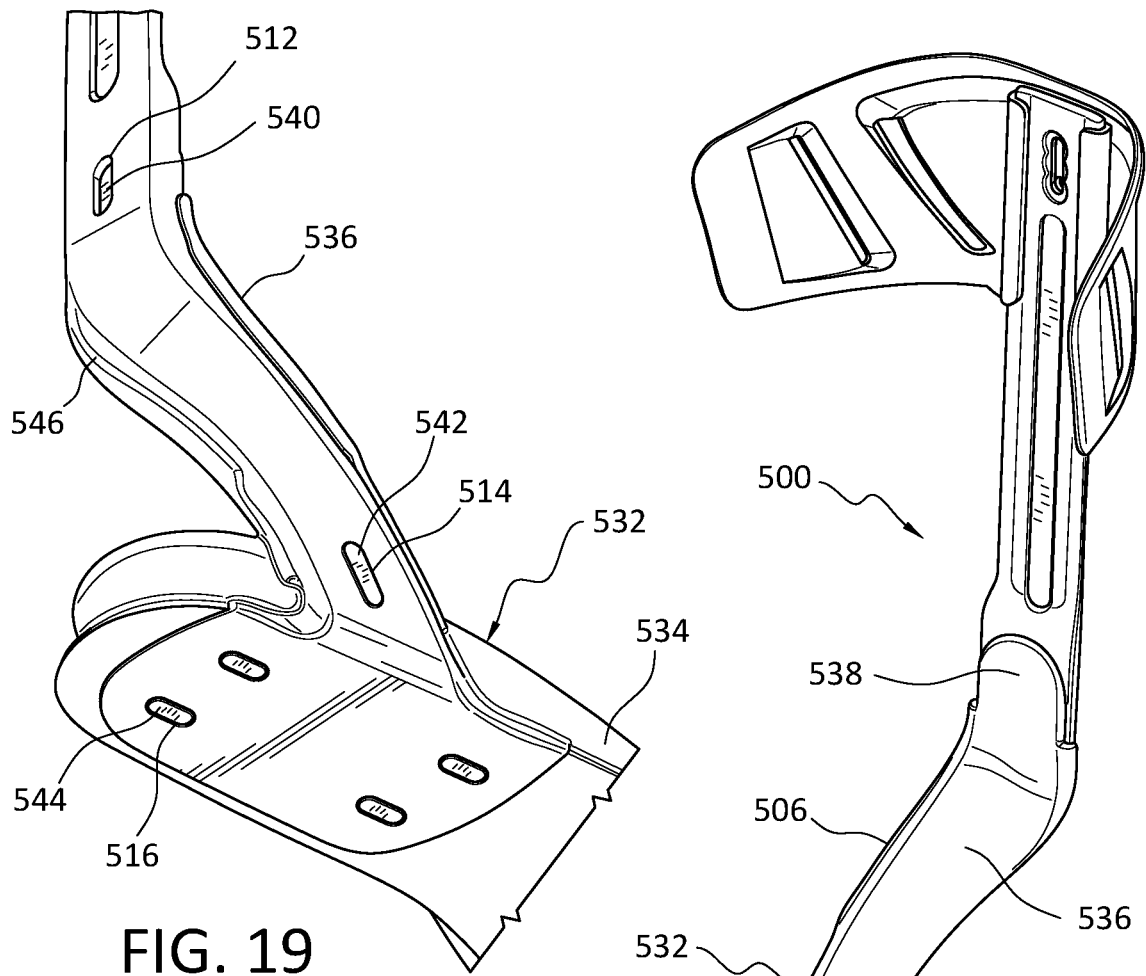
FIG. 18 is a perspective view of the embodiment of FIG. 15 with padding and an interlocking insole feature provided along the spiral portion and along the footplate.
Figure 19:
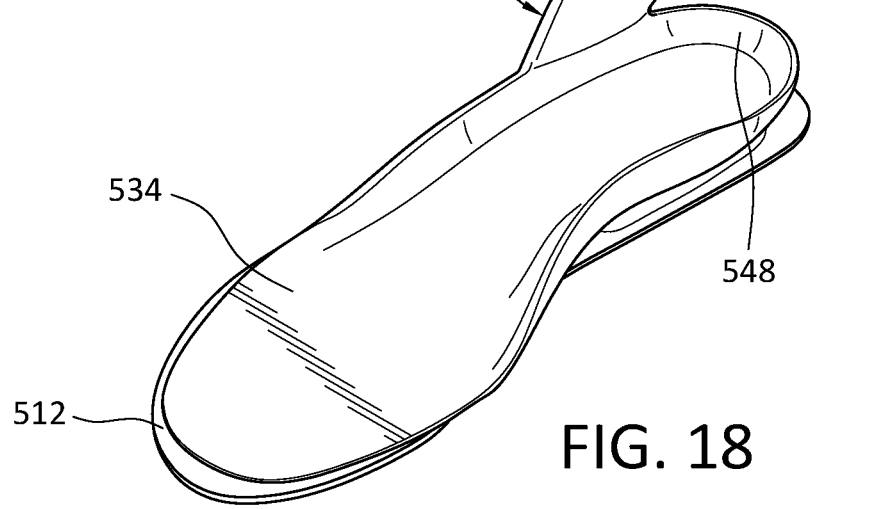
FIG. 19 is a sectional perspective view of the embodiment of FIG. 18.

FIG. 18 depicts the AFO 500 of FIG. 15 with a padding and insole feature 532 along the spiral portion 506 and along the footplate 502. A section 538 of the padding extends below the thickness transition and lines the inner side of the AFO 500 facing the user's ankle at the padded spiral portion 536. The section 538 can interlock with a slot 540 (as shown in FIG. 19). The feature 532 may include an insole portion 534 that extends along the footplate 502 and has a concave surface 548 to better adapt to a user's foot. The insole portion 534 may be separate from the feature 532 along the spiral portion 506, or they may be integrated as a single piece that is either adhered to or interfitted, as shown in FIG. 19, to the AFO 500. Various materials can be used to form the feature and insole, and an exemplary material is EVA (Ethylene-Vinyl Acetate). A portion of the feature 532 may cover or hug at least the edges of the spiral portion 506 to avoid shifting or migration during use.

FIG. 19 shows the feature 532 has plugs or inserts 540, 542, 544 that resiliently fit into the slots 512, 516 formed by the AFO 500, so the feature 532 can be easily removed from the AFO 500 and not form a permanent connection. A corresponding insole portion 534 may be provided with the AFO 500 for the sound foot and insertable into a shoe to create the same combined height as the AFO 500 and the insole 524, so both legs are balanced in height during use when worn with shoes.

It is to be understood that not necessarily all objects or advantages may be achieved under any embodiment of the disclosure. Those skilled in the art will recognize that an AFO may be embodied or carried out in a manner that achieves or optimizes one advantage or group of advantages as taught herein without achieving other objects or advantages as taught or suggested herein.

The skilled artisan will recognize the ability to adapt an AFO according to the CFRTP and injection molding techniques and subsequent definitive structure yielded by overmolding various CFRTP tapes with a thermoplastic. Besides the variations described herein, other known equivalents for each feature can be mixed and matched by one of ordinary skill in this art to build and use an AFO under principles of the present disclosure. The skilled artisan will understand that the features described herein may be adapted to other methods and types of orthopedic and prosthetic devices.

Although this disclosure describes certain exemplary embodiments and examples of an AFO, it will be understood by those skilled in the art that the present disclosure extends beyond the specifically disclosed attachment systems to other alternative embodiments and/or uses of the disclosure and obvious modifications and equivalents thereof, including other types and components of various devices, including orthopedic, prosthetic, medical, and otherwise. It is intended that the present disclosure should not be limited by the disclosed embodiments described above and may be extended to other applications that may employ the features described herein.

The invention claimed is:

1. An ankle-foot orthosis, comprising:
a monolithic structure comprising at least two different material components, wherein a first material component includes at least one tape layer formed by a continuous fiber-reinforced thermoplastic composite (CFRTP), and a second polymeric material component surrounding at least in part the tape and including a thermoplastic material into which the first material component is embedded;
wherein a resin material of the first material component is bonded to the second polymeric material component;
wherein the first material component comprises at least first and second tape segments spaced apart and secured to one another by the second polymeric material component wherein a peripheral edge of the first tape segment is surrounded by the second polymeric material component and wherein a periphery of the ankle-foot orthosis generally corresponds in shape to at least part of the peripheral edge of the first tape segment.

2. The ankle-foot orthosis of claim 1, wherein a periphery of the ankle-foot orthosis is defined by the second polymeric material component.

3. The ankle-foot orthosis of claim 2, wherein the first tape segment defines an interlocking feature through or into which the second polymeric material component extends and interlocks with the first tape segment.

4. The ankle-foot orthosis of claim 1, wherein the second polymeric material component is compressed and molded into a definitive shape surrounding the first material component, the second polymeric material component is interfused with the first polymeric material component.

5. The ankle-foot orthosis of claim 1, wherein the second polymeric material component is overmolded about the first material component.

6. The ankle-foot orthosis of claim 1, wherein an exterior surface of the ankle-foot orthosis is defined by the second polymeric material component.

7. The ankle-foot orthosis of claim 6, wherein an entirety of the exterior surface is defined by the second polymeric material component defined as a thermoplastic matrix material.

8. The ankle-foot orthosis of claim 1, wherein an entirety of an interior surface is defined by the second polymeric material component, the first material component is defined within a thickness of the second polymeric material component.

9. The ankle-foot orthosis of claim 1, wherein the first material component includes a heel portion, an ankle portion, an ankle strut, and a spiraling lower leg portion formed from a first continuous tape segment without interruption and shaped in a three-dimensional configuration and having sections adapted to accommodate human anatomy about a heel, ankle and lower leg of a user.

10. The ankle-foot orthosis of claim 9, the ankle portion extends from a lateral side of the heel portion and spirals from the lateral side to a posterior side adapted to a posterior lower leg.

11. The ankle-foot orthosis of claim 9, further comprising a second continuous tape segment overlapping at least part of the first continuous tape segment, the second continuous tape segment sharing at least in part a peripheral contour with the first continuous tape segment.

12. The ankle-foot orthosis of claim 11, wherein the second continuous tape segment extends over the first continuous tape segment at least over the ankle portion,
wherein the ankle portion is made thicker relative to areas of the first continuous tape segment without the second continuous tape segment extending thereover.

13. The ankle-foot orthosis of claim 12, wherein a third continuous tape segment extends over the second continuous tape segment and defines a peripheral contour similar or the same at least in part to a peripheral contour of the second continuous tape segment.

14. An ankle-foot orthosis, comprising:
a monolithic structure having at least one layer of a continuous fiber-reinforced thermoplastic composite including a plurality of reinforcement fibers in a thermoplastic base resin, and a thermoplastic material component encasing the at least one layer of a continuous fiber-reinforced thermoplastic composite,
the ankle-foot orthosis including a footplate having a line of progression extending from a heel portion to an ankle portion to a toe portion of the footplate; and
a resilient leg support having first and second end portions with a middle spiral portion therebetween, the first end portion being inseparably connected to the footplate;
wherein the leg support and the footplate are integrated by the thermoplastic base resin;
wherein the at least one layer of continuous fiber-reinforced thermoplastic comprises first and second tape segments spaced apart a distance by the thermoplastic material component wherein the first and second tape segments having first and second interlocking sections defined by complementary shapes, for example, the first interlocking section has a protruding shape and the second interlocking section defines a recess adapted in shape to the protruding shape of the first interlocking section with a distance therebetween formed by the thermoplastic material component.

15. The ankle-foot orthosis of claim 14, wherein the at least one layer of continuous fiber-reinforced thermoplastic extends into both the footplate and the leg support and is surrounded by the thermoplastic material component.

16. The ankle-foot orthosis of claim 14, wherein the fibers are generally oriented at an oblique angle relative to a line of progression of the footplate extending from a heel portion to an ankle portion to a toe portion of the footplate.

17. The ankle-foot orthosis of claim 14, wherein the thermoplastic material component is compressed and molded into a definitive shape surrounding the first and second tape segments, the thermoplastic material component is interfused with the the first and second tape segments.

* * * * *